United States Patent
Cho

(10) Patent No.: US 9,868,364 B2
(45) Date of Patent: Jan. 16, 2018

(54) APPARATUS AND METHOD OF CONTROLLING CREEP DRIVING OF ELECTRIC VEHICLE

(71) Applicant: Hyundai Motor Company, Seoul (KR)

(72) Inventor: Woo Cheol Cho, Daejeon (KR)

(73) Assignee: Hyundai Motor Company, Seoul (KR)

( * ) Notice: Subject to any disclaimer, the term of this patent is extended or adjusted under 35 U.S.C. 154(b) by 28 days.

(21) Appl. No.: 14/940,530

(22) Filed: Nov. 13, 2015

(65) Prior Publication Data

US 2016/0303998 A1  Oct. 20, 2016

(30) Foreign Application Priority Data

Apr. 16, 2015 (KR) .................. 10-2015-0053974

(51) Int. Cl.
  *B60L 15/20* (2006.01)
  *B60L 7/18* (2006.01)

(52) U.S. Cl.
  CPC .......... *B60L 15/2063* (2013.01); *B60L 7/18* (2013.01); *B60L 2240/12* (2013.01); *B60L 2240/423* (2013.01); *B60L 2250/28* (2013.01); *Y02T 10/7275* (2013.01); *Y02T 10/76* (2013.01)

(58) Field of Classification Search
  CPC .................................................. B60L 15/2063
  USPC ....................................................... 701/22
  See application file for complete search history.

(56) References Cited

U.S. PATENT DOCUMENTS

| 7,220,212 | B2 | 5/2007 | Endo | |
|---|---|---|---|---|
| 9,139,105 | B2 | 9/2015 | Kim | |
| 2005/0233856 | A1 | 10/2005 | Endo | |
| 2010/0089673 | A1* | 4/2010 | Wisniewski | B60K 6/365 180/65.285 |
| 2010/0235043 | A1* | 9/2010 | Seta | B60L 3/0038 701/29.2 |
| 2014/0379190 | A1* | 12/2014 | Sawada | B60T 1/10 701/22 |
| 2015/0224976 | A1* | 8/2015 | Wang | B60W 10/08 701/22 |
| 2016/0046205 | A1* | 2/2016 | Park | B60L 15/2063 701/22 |

FOREIGN PATENT DOCUMENTS

| EP | 1359336 B1 | 3/2009 |
|---|---|---|
| JP | 2001-218303 A | 8/2001 |
| JP | 2003-250202 A | 9/2003 |
| JP | 2005-304264 A | 10/2005 |
| JP | 2007-236168 A | 9/2007 |
| JP | 2012-017101 A | 1/2012 |
| KR | 10-2006-0045762 A | 5/2006 |
| KR | 10-2010-0005764 A | 1/2010 |
| KR | 10-2011-0054983 A | 5/2011 |
| KR | 10-1459425 | 5/2011 |

(Continued)

*Primary Examiner* — Redhwan K Mawari
*Assistant Examiner* — Anshul Sood
(74) *Attorney, Agent, or Firm* — Mintz Levin Cohn Ferris Glovsky and Popeo, P.C.; Peter F. Corless

(57) ABSTRACT

An apparatus and a method of controlling creep driving of an electric vehicle are provided to improve driving convenience and fuel efficiency. The apparatus is applied to an electric vehicle to which a 'one-foot drive' mode is applied to execute the creep driving and actively determine whether the creep driving is provided based on a vehicle speed.

15 Claims, 3 Drawing Sheets

(56) References Cited

FOREIGN PATENT DOCUMENTS

| KR | 10-1134863 B1 | 4/2012 |
|----|---------------|--------|
| KR | 10-2012-0058147 A | 6/2012 |
| KR | 10-1221798 | 1/2013 |

* cited by examiner

APPARATUS AND METHOD OF CONTROLLING CREEP DRIVING OF ELECTRIC VEHICLE

CROSS-REFERENCE TO RELATED APPLICATION

This application is based on and claims the benefit of priority to Korean Patent Application No. 10-2015-0053974, filed on Apr. 16, 2015 in the Korean Intellectual Property Office, the disclosure of which is incorporated herein in its entirety by reference.

TECHNICAL FIELD

The present disclosure relates to an apparatus and a method of controlling creep driving of an electric vehicle, and more particularly, to a technology of controlling creep driving in an electric vehicle when a 'one-foot drive' mode is applied.

BACKGROUND

Generally, a 'one-foot drive' mode is capable of stopping a vehicle even a brake pedal remains disengaged by applying a fixed cost regenerative torque to a driving motor when the accelerator pedal is disengaged. Such a driving mode has been applied to electric vehicles using a motor as a driving source, such as an electric vehicle (EV), a fuel cell electric vehicle (FCEV), a hybrid electric vehicle (HEV), a plug-in hybrid electric vehicle (PHEV), and the like. The electric vehicle to which the 'one-foot drive' mode is applied may decrease loss due to hydraulic brake to improve fuel efficiency, and allow the driver to drive the electric vehicle by a manipulation of the accelerator pedal.

However, since the vehicle is stopped when the accelerator pedal is disengaged, the accelerator pedal should be engaged when creep driving is desired or intended (e.g., while parking the vehicle), which is inconvenient. As a result, the electric vehicle according to the related art to which the 'one-foot drive' mode is applied does not provide the creep driving. In addition, since the electric vehicle according to the related art to which the 'one-foot drive' mode is applied is decelerated based on the fixed coast regenerative torque, drivability of the vehicle is deteriorated.

SUMMARY

The present disclosure provides an apparatus and a method of controlling creep driving of an electric vehicle capable of providing driving convenience to a driver and improving fuel efficiency by being applied to an electric vehicle to which a 'one-foot drive' mode is applied to provide the creep driving and actively determine whether the creep driving is provided based on a vehicle speed. In the present disclosure, a coast regenerative torque is a type of counter torque acting on a driving motor in a counter direction to a movement direction of a vehicle during coasting to decelerate the vehicle, a creep torque is a torque that slowly launches the vehicle when brake and accelerator pedals are not manipulated (e.g., remain disengaged), and creep driving means vehicle driving based on the creep torque.

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, an apparatus of controlling creep driving of an electric vehicle to which a 'one-foot drive' mode is applied may include: a storage configured to store a reference torque map for creep driving and a reference torque map for a stop in which a coast regenerative torque that corresponds to a vehicle speed may be recorded; a sensor configured to detect whether an accelerator pedal is disengaged (e.g., pressure exerted onto the pedal is released); a vehicle speed sensor configured to detect a vehicle speed; and a controller configured to select any one of the reference torque map for creep driving and the reference torque map for a stop stored in the storage based on the vehicle speed detected by the vehicle speed sensor based on a sensed signal from the sensor.

According to another exemplary embodiment of the present disclosure, a method of controlling creep driving of an electric vehicle to which a 'one-foot drive' mode is applied may include: storing a reference torque map for creep driving and a reference torque map in a storage for a stop in which a coast regenerative torque that corresponds to a vehicle speed is recorded; detecting whether an accelerator pedal is disengaged; detecting a vehicle speed; and selecting any one of the reference torque map for creep driving and the reference torque map for a stop based on the detected vehicle speed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
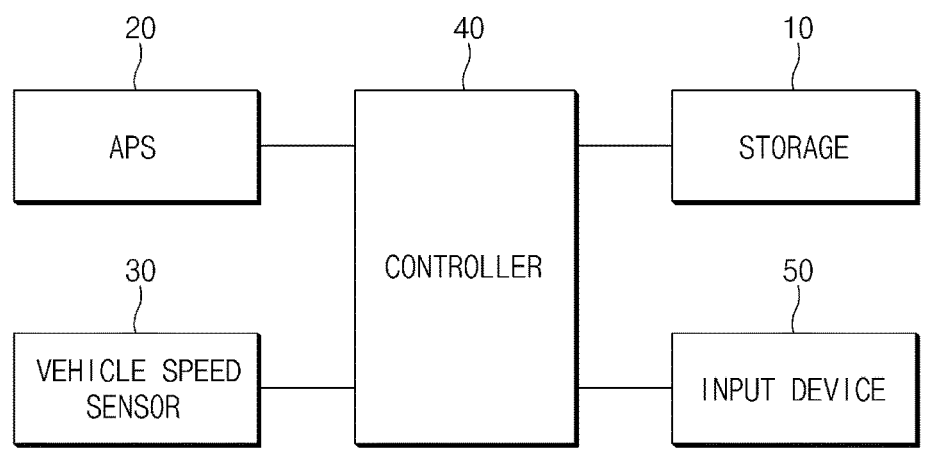
FIG. 1 is a diagram illustrating an apparatus of controlling creep driving of an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the tem "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, when it is determined that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

FIG. 1 is a diagram illustrating an apparatus of controlling creep driving of an electric vehicle according to an exemplary embodiment of the present disclosure. As illustrated in FIG. 1, the apparatus of controlling creep driving of an electric vehicle according to an exemplary embodiment of the present disclosure may include a storage 10, an accelerator position sensor (APS) 20, a vehicle speed sensor 30, a controller 40, and an input device 50. The controller 40 may be configured to operate the storage 10, the APS 20, the vehicle speed sensor 30, and the input device 50.

The above-mentioned respective components will be described. First, the storage 10 (e.g., a memory) may be configured to store torque maps in which a coast regenerative torque and a creep torque that correspond to a vehicle speed are recorded. In other words, the storage 10 may be configured to store a reference torque map 210 for creep driving and a reference torque map 211 for a stop of the vehicle.

Figure 2:
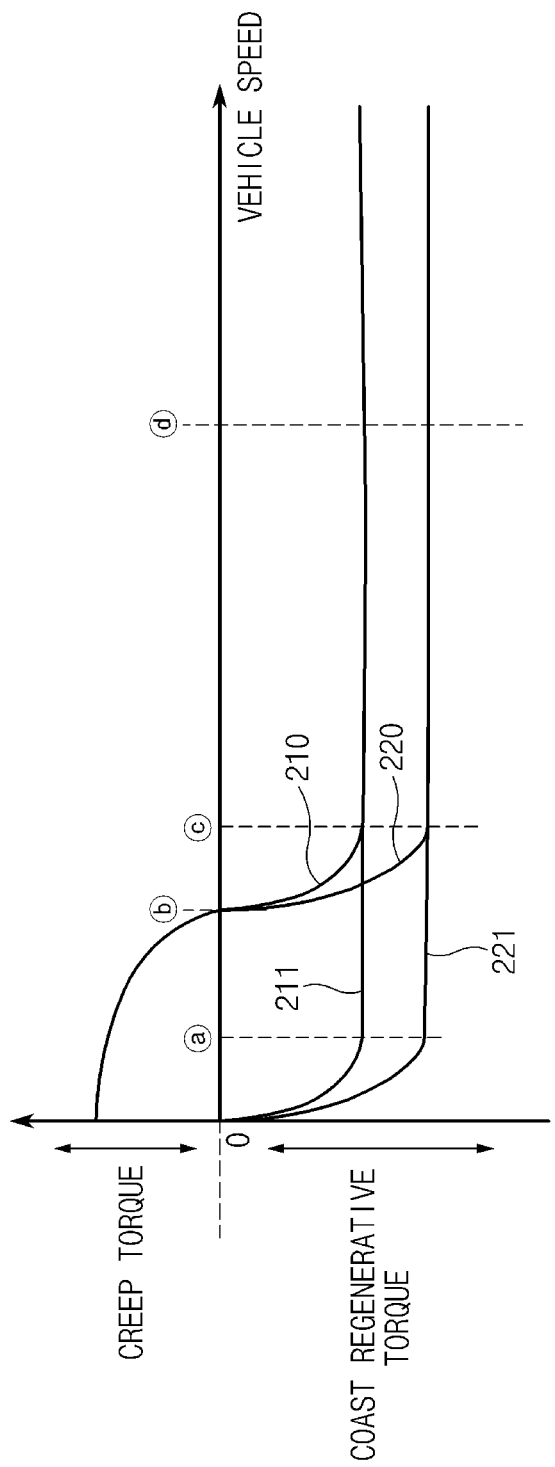
FIG. 2 is an illustrative view of torque maps in which a coast regenerative torque and a creep torque corresponding to a vehicle speed are recorded according to an exemplary embodiment of the present disclosure.

Hereinafter, these torque maps will be described in detail with reference to FIG. 2. In particular, FIG. 2 is an illustrative view of torque maps in which a coast regenerative torque and a creep torque that correspond to a vehicle speed are recorded according to an exemplary embodiment of the present disclosure. As shown in FIG. 2, an x axis indicates a vehicle speed, a positive y axis indicates a creep torque, and a negative y axis means a coast regenerative torque. Particularly, the creep torque, which is a torque in a forward direction (e.g., a movement direction of the vehicle), is represented by a positive (+) value, the coast regenerative torque, which is a torque in a counter direction (e.g., an opposite direction to the movement direction of the vehicle), is represented by a negative (−) value, and an increase in the coast regenerative torque indicates movement toward a downward direction in a coast regenerative torque region.

In addition, ⓐ indicates a vehicle speed at a point in time in which the coast regenerative torque is decreased to slowly (e.g., in proportion to the vehicle speed) stop or brake the vehicle, ⓑ indicates a vehicle speed (e.g., about 10 KPH) at a point in time in which the coast regenerative torque becomes about 0 for the purpose of the creep driving, ⓒ indicates a vehicle speed (e.g., about 13 KPH) at a point in time in which the coast regenerative torque is slowly (e.g., in proportion to the vehicle speed) decreased for the purpose of the creep driving, and ⓓ indicates a reference speed (e.g., about 30 KPH) determining whether the creep driving is generated.

In addition, a torque map of '210' indicates a coast regenerative torque for the purpose of the creep driving applied when a vehicle speed at a point in time in which an accelerator pedal is disengaged exceeds the reference speed ⓓ. The coast regenerative torque 210 may be maintained as a substantially constant value from a current vehicle speed to the vehicle speed of ⓒ, is slowly decreased, and may become about 0 when a vehicle speed reaches the vehicle speed of ⓑ. In addition, a torque map of '211' indicates a coast regenerative torque for the purpose of a stop applied when the vehicle speed at the point in time in which the accelerator pedal is disengaged does not exceed (e.g., is less than) the reference speed ⓓ. The coast regenerative torque 211 may be maintained as a substantially constant value from a current vehicle speed to the vehicle speed of ⓐ, is slowly decreased, and may become about 0.

Further, a torque map of '220' indicates a state in which the coast regenerative torque is increased in the torque map of '210'. In other words, when a request for an increase in the coast regenerative torque is received from the driver when the torque map of '210' is applied, the coast regenerative torque may be increased as in the torque map of '220' as an example. In particular, a request increase amount from the driver may be reflected.

A torque map of '221' indicates a state in which the coast regenerative torque may be increased in the torque map of '211'. In other words, when a request for an increase in the coast regenerative torque is received from the driver when the torque map of '211' is applied, the coast regenerative torque may be increased as in the torque map of '221' as an example. In particular, a request increase amount from the driver may be reflected.

It has been represented in FIG. 2 that when the vehicle speed at the point in time in which the accelerator pedal is disengaged exceeds the reference speed, the creep driving may be generated, when the vehicle speed at the point in time in which the accelerator pedal is disengaged does not exceed the reference speed, the vehicle may be stopped. When a request is received for the increase in the coast regenerative torque, an increment may be reflected to increase a deceleration of the vehicle. In particular, for the increase in the coast regenerative torque, a value of the coast regenerative torque may be increased while a form of a coast regenerative torque map being maintained. For example, a result obtained by increasing the coast regenerative torque of '210' is the same as the coast regenerative torque of '220', and a result obtained by increasing the coast regenerative torque of '211' is the same as the coast regenerative torque of '221'.

Furthermore, the APS 20 may be configured to sense whether the accelerator pedal is disengaged. In other words, the APS 20 may be configured to detect whether the accelerator pedal is engaged (e.g., whether pressure is exerted onto the pedal). The vehicle speed sensor 30 may be configured to detect the vehicle speed. The controller 40 may be configured to execute a general control so that the above-mentioned respective components may normally perform their functions (e.g., operate without failure or error). Particularly, the controller 40 may be configured to confirm the vehicle speed sensed by the vehicle speed sensor 30 based on a sensing signal (e.g., a signal generated when the accelerator pedal is disengaged) from the APS 20.

Additionally, the controller 40 may be configured to execute the creep driving or the stop of the vehicle based on the vehicle speed sensed by the vehicle speed sensor 30 and the torque maps stored in the storage 10. In other words, the controller 40 may be configured to execute the creep driving based on the torque map 210 for creep driving stored in the storage 10 when the vehicle speed detected by the vehicle speed sensor 30 is greater than the reference speed. In addition, the controller 40 may be configured to stop the vehicle based on the torque map 211 for a stop stored in the storage 10 when the vehicle speed detected by the vehicle speed sensor 30 is less than the reference speed. Particularly, the controller 40 may be configured to block the creep torque. Meanwhile, the controller 40 may be configured to follow the coast regenerative torque map of '210' when a brake pedal is disengaged and the vehicle is stopped. In other words, when the vehicle speed is ⓑ or less, the creep driving may be performed through the creep torque.

Moreover, the apparatus of controlling creep driving of an electric vehicle according to an exemplary embodiment of the present disclosure may further include the input device 50 configured to receive a request for an increase in the coast regenerative torque from the driver. In particular, as the controller 40 receives the request for the increase in the coast regenerative torque from the driver via the input device 50, the controller 40 may be configured to increase the coast regenerative torque of the torque map stored in the storage 10. The input device 50 may be implemented using a coast regenerative increase button, a paddle shift switch, a manual shifting mode (+/−) of an automatic transmission, or the like.

Although a technology of detecting a point in time in which the coast regenerative torque is applied through the APS 20 and sensing the vehicle speed through the vehicle speed sensor 30 has been disclosed in an exemplary embodiment of the present disclosure, it is obvious that various information other than the above-mentioned information may be obtained via a vehicle network The vehicle network may include a controller area network (CAN), a local interconnect network (LIN), a FlexRay, a media oriented system transport (MOST), and the like.

Figure 3:
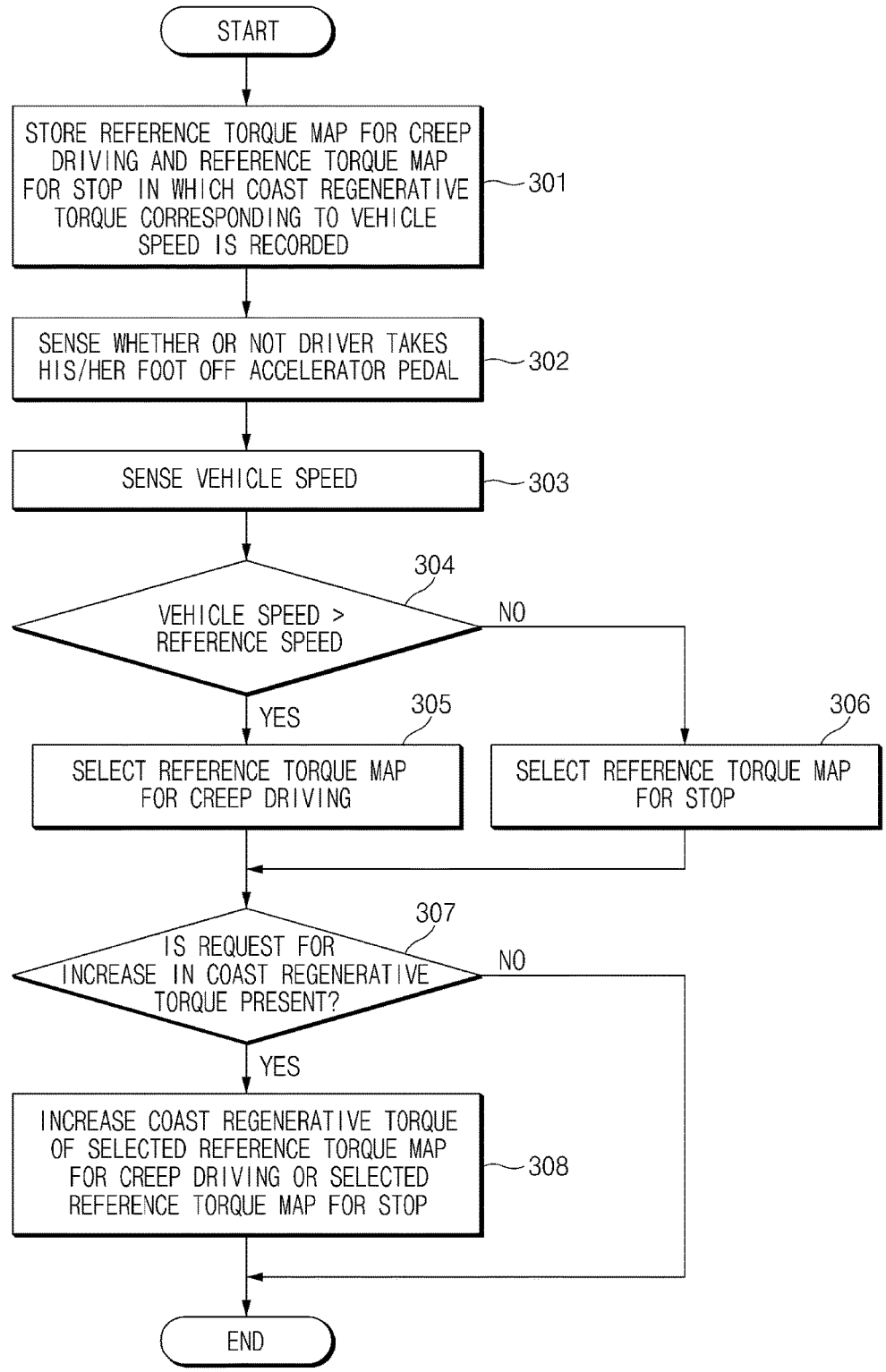
FIG. 3 is a flow chart illustrating a method of controlling creep driving of an electric vehicle according to an exemplary embodiment of the present disclosure.

FIG. 3, which is a flow chart illustrating a method of controlling creep driving of an electric vehicle according to an exemplary embodiment of the present disclosure, illustrates a process of controlling creep driving of an electric vehicle to which a 'one-foot drive' mode may be applied. First, the storage 10 may be configured to store the reference torque map for creep driving and the reference torque map for a stop of the vehicle in which the coast regenerative torque that corresponds to the vehicle speed is recorded (301).

Then, the APS 20 may be configured to detect whether the accelerator pedal is disengaged (302) and the vehicle speed sensor 30 may be configured to detect the vehicle speed (303). The controller 40 may be configured to determine whether the detected vehicle speed is greater than the reference speed (304). When the vehicle speed is greater than the reference speed, the reference torque map for creep driving may be selected (305). When the vehicle speed is less than the reference speed, the reference torque map for a stop may be selected (306). The controller may then be configured to determine whether the request for the increase in the coast regenerative torque from the driver is present (307).

When the request for the increase in the coast regenerative torque is present, the cost regenerative torque of the selected reference torque map for creep driving or the selected reference torque map for a stop may be increased (308). In particular, when the request for the increase in the coast regenerative torque is not present, the selected reference torque map for creep driving or the selected reference torque map for a stop may be applied to execute the creep driving or the stop.

Meanwhile, the method of controlling creep driving of an electric vehicle according to an exemplary embodiment of the present disclosure as described above may be implemented by a computer program. In addition, codes and code segments configuring the computer program may be easily inferred by a computer programmer skilled in the art. Further, the computer program may be stored in a computer-readable recording medium (information storing medium) and read and executed by a computer to implement the method of controlling creep driving of an electric vehicle according to an exemplary embodiment of the present disclosure. In addition, the computer-readable recording medium includes all types of recording media that may be read by the computer.

As described above, the apparatus and the method of controlling creep driving of an electric vehicle according to an exemplary embodiment of the present disclosure are applied to the electric vehicle to which the 'one-foot drive' mode is applied to provide the creep driving, and actively determines whether the creep driving is provided based on the vehicle speed, thereby making it possible to provide driving convenience to the driver and improve fuel efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus of controlling creep driving of an electric vehicle to which a 'one-foot drive' mode is applied, comprising:

a storage configured to store a reference torque map for creep driving and a reference torque map for a stop in which a coast regenerative torque that corresponds to a vehicle speed is recorded;

an accelerator position sensor configured to detect whether an accelerator pedal is disengaged;

a vehicle speed sensor configured to detect a vehicle speed; and a controller configured to select any one of the reference torque map for creep driving and the reference torque map for a stop stored in the storage based on the detected vehicle speed when brake and accelerator pedals are disengaged, wherein the controller is configured to perform creep driving or the stop based on the detected vehicle speed and the selected reference torque map.

2. The apparatus of controlling creep driving of an electric vehicle according to claim 1, wherein the controller is configured to select the reference torque map for creep driving when the detected vehicle speed is greater than a reference speed, and select the reference torque map for a stop when the detected vehicle speed is less than the reference speed.

3. The apparatus of controlling creep driving of an electric vehicle according to claim 2, wherein in the reference torque map for creep driving and the reference torque map for a stop, a coast regenerative torque acting on a driving motor in a counter direction to a movement direction of the vehicle is recorded to correspond to the vehicle speed.

4. The apparatus of controlling creep driving of an electric vehicle according to claim 3, further comprising:

an input device configured to receive a request for an increase in the coast regenerative torque from the driver.

5. The apparatus of controlling creep driving of an electric vehicle according to claim 4, wherein the controller is configured to increase a torque amount of the selected reference torque map for creep driving or the selected reference torque map for a stop based on the received request for the increase in the coast regenerative torque.

6. A method of controlling creep driving of an electric vehicle to which a 'one-foot drive' mode is applied, comprising:

storing, by a controller, a reference torque map for creep driving and a reference torque map for a stop in which a coast regenerative torque that corresponds to a vehicle speed is recorded;

detecting, by a first sensor, whether an accelerator pedal is disengaged;

detecting, by a second sensor, a vehicle speed;

selecting, by the controller, any one of the reference torque map for creep driving and the reference torque map for a stop based on the detected vehicle speed when brake and accelerator pedals are disengaged; and performing, by the the controller, creep driving or the stop based on the detected vehicle speed and the selected reference torque map.

7. The method of controlling creep driving of an electric vehicle according to claim 6, wherein the reference torque map for creep driving is selected when the sensed vehicle speed is greater than a reference speed, and the reference torque map for a stop is selected when the sensed vehicle speed is less than the reference speed.

8. The method of controlling creep driving of an electric vehicle according to claim 7, wherein in the reference torque map for creep driving and the reference torque map for a stop, a coast regenerative torque acting on a driving motor in a counter direction to a movement direction of the vehicle is recorded to correspond to the vehicle speed.

9. The method of controlling creep driving of an electric vehicle according to claim 8, further comprising:

receiving, at the controller, a request for an increase in the coast regenerative torque from the driver.

10. The method of controlling creep driving of an electric vehicle according to claim 9, wherein a torque amount of the selected reference torque map for creep driving or the selected reference torque map for a stop is increased based on the received request for the increase in the coast regenerative torque.

11. A non-transitory computer readable medium containing program instructions executed by a controller, the computer readable medium comprising:

program instructions that store a reference torque map for creep driving and a reference torque map for a stop in which a coast regenerative torque that corresponds to a vehicle speed is recorded;

program instructions that control a first sensor to detect whether an accelerator pedal is disengaged;

program instructions that control a second sensor to detect a vehicle speed;

program instructions that select any one of the reference torque map for creep driving and the reference torque map for a stop based on the detected vehicle speed when brake and accelerator pedals are disengaged; and program instructions that perform creep driving or the stop based on the detected vehicle speed and the selected reference torque map.

12. The non-transitory computer readable medium of claim 11, wherein the reference torque map for creep driving is selected when the sensed vehicle speed is greater than a reference speed, and the reference torque map for a stop is selected when the sensed vehicle speed is less than the reference speed.

13. The non-transitory computer readable medium of claim 12, wherein in the reference torque map for creep driving and the reference torque map for a stop, a coast regenerative torque acting on a driving motor in a counter direction to a movement direction of the vehicle is recorded to correspond to the vehicle speed.

14. The non-transitory computer readable medium of claim 13, further comprising:

program instructions that receive a request for an increase in the coast regenerative torque from the driver.

15. The non-transitory computer readable medium of claim 14, wherein a torque amount of the selected reference torque map for creep driving or the selected reference torque map for a stop is increased based on the received request for the increase in the coast regenerative torque.

* * * * *